United States Patent [19]

Shamie

[11] Patent Number: 5,288,098
[45] Date of Patent: Feb. 22, 1994

[54] UMBRELLA STROLLER WITH UPPER SAFETY BAR RELEASE MECHANISM

[76] Inventor: Louis Shamie, 972 Dean St., Brooklyn, N.Y. 11238

[21] Appl. No.: 994,548

[22] Filed: Dec. 21, 1992

[51] Int. Cl.$^5$ .............................................. B62B 7/06
[52] U.S. Cl. ..................... 280/642; 280/42; 280/650; 297/42
[58] Field of Search ................ 280/42, 647, 650, 638, 280/639, 641, 642, 644, 649, 47.38, 47.4; 297/42, 45, DIG. 4

[56] References Cited

U.S. PATENT DOCUMENTS

| | | | |
|---|---|---|---|
| 4,202,278 | 5/1980 | Wadenhed | 280/79.3 X |
| 4,232,897 | 11/1980 | Maclaren | 280/647 X |
| 4,266,807 | 5/1981 | Griffin | 280/42 X |
| 4,428,598 | 1/1984 | Kassai | 280/42 X |
| 4,765,647 | 8/1988 | Shamie | 280/650 X |
| 4,986,564 | 1/1991 | Liu | 280/650 X |
| 5,020,816 | 6/1991 | Mulholland | 280/647 X |
| 5,181,735 | 1/1993 | Onishi | 280/42 X |

Primary Examiner—Margaret A. Focarino
Assistant Examiner—Michael Mar
Attorney, Agent, or Firm—Burgess, Ryan & Wayne

[57] ABSTRACT

A stroller includes a pair of side frames; a bottom scissor frame for foldably connecting the side frames together; a lower articulated safety spreader bar mechanism for releasably locking a lower portion of the side frames in a spaced apart configuration, the lower spreader bar mechanism being moveable between a locked and unlocked position and including first and second pairs of lower pivoting spreader bars, each bar pivotally connected between a side frame and a central position, a connecting bar connecting together the first and second pairs of bars, and a lower releasable locking assembly for releasably locking the second pair of bars in a locked position; an upper articulated safety spreader bar mechanism for releasably locking an upper portion of the side frames in a spaced apart configuration, the upper spreader bar mechanism being moveable between a locked and unlocked position and including a pair of upper pivoting spreader bars, each pivotally connected between a side frame and a central position, and an upper releasable locking assembly for releasably locking the pair of upper pivoting spreader bars in a locked position; and a release bar connected between one lower pivoting spreader bar and one of the first pair of upper pivoting spreader bars so as to automatically pivot the upper pivoting spreader bars with respect to each other, thereby releasing the locking, engagement of the upper releasable locking assembly, upon pivoting movement of the first pair of lower pivoting spreader bars with respect to each other.

3 Claims, 4 Drawing Sheets

UMBRELLA STROLLER WITH UPPER SAFETY BAR RELEASE MECHANISM

BACKGROUND OF THE INVENTION

The present invention relates generally to strollers, and more particularly, is directed to an umbrella stroller having upper and lower safety spreader bar locks.

Conventionally, an umbrella stroller has a lower articulated safety spreader bar mechanism connected between the frame halves for holding the frame halves apart. The umbrella stroller is folded by pivoting the two parts of the lower articulated safety spreader bar mechanism upwardly so that the scissor frames collapse to permit the side frame halves to move together. A locking mechanism is generally associated with the lower articulated safety spreader bar mechanism in order to prevent accidental release of the lower articulated safety spreader bar mechanism. An umbrella stroller of this type is described in U.S. Pat. No. 4,765,645 to the same inventor herein, and the entire disclosure of which is incorporated herein by reference.

In addition to the lower articulated safety spreader bar mechanism, an umbrella stroller may also include an upper articulated safety spreader bar mechanism that functions as a safety bar and also adds to the structural integrity of the stroller. However, it has been found that the person closing the umbrella stroller may forget to release the upper articulated safety spreader bar mechanism. As a result, when the person attempts to close the stroller, the upper articulated safety spreader bar mechanism will break. As a result, the stroller may not be usable until the upper articulated safety spreader bar mechanism is fixed.

Other types of related strollers are described in U.S. Pat. Nos. 4,527,665; 4,529,219; 4,632,421; 4,725,071; and 4,743,043, all to the same inventor herein, and the entire disclosures of which are incorporated herein by reference.

OBJECTS AND SUMMARY OF THE INVENTION

Accordingly, it is an object of the present invention to provide an umbrella stroller that overcomes the problems with the aforementioned prior art.

It is another object of the present invention to provide an umbrella stroller in which the upper articulated safety spreader bar mechanism is automatically released when the lower articulated safety spreader bar mechanism is released.

In accordance with an aspect of the present invention, a stroller includes a pair of side frames; bottom scissor frame means for foldably connecting the side frames together; lower articulated safety spreader bar means for releasably locking a lower portion of the side frames in a spaced apart, open configuration, the lower articulated safety spreader bar means being moveable between a locked position and an unlocked position; upper articulated safety spreader bar means for releasably locking an upper portion of the side frames in a spaced apart, open configuration, the upper articulated safety spreader bar means being moveable between a locked position and an unlocked position; and release means for automatically moving the upper articulated safety spreader bar means from the locked position to the unlocked position thereof when the lower articulated safety spreader bar means is moved from the locked position to the unlocked position thereof.

Specifically, the lower articulated safety spreader bar means includes a pair of lower pivoting spreader bars, each pivotally connected at one end to a respective side frame and to a central position at opposite ends thereof, and lower releasable locking means for releasably locking the pair of lower pivoting spreader bars in a locked position in which the lower portions of the side frames are maintained in the spaced apart, open configuration; the upper articulated safety spreader bar means includes a pair of upper pivoting spreader bars, each pivotally connected at one end to a respective side frame and to a central position at opposite ends thereof, and upper releasable locking means for releasably locking the pair of pivoting spreader bars in a locked position in which the upper portions of the side frames are maintained in the spaced apart, open configuration; and the release means automatically pivots the upper pivoting spreader bars with respect to each other, thereby releasing the locking engagement of the upper releasable locking means, upon pivoting movement of the lower pivoting spreader bars with respect to each other.

Preferably, the release means includes a release bar connected between one lower pivoting spreader bar and one upper pivoting spreader bar.

The above and other objects, features and advantages of the invention will become readily apparent from the following detailed description thereof which is to be read in connection with the accompanying drawings.

DETAILED DESCRIPTION OF A PREFERRED EMBODIMENT

Figure 1:
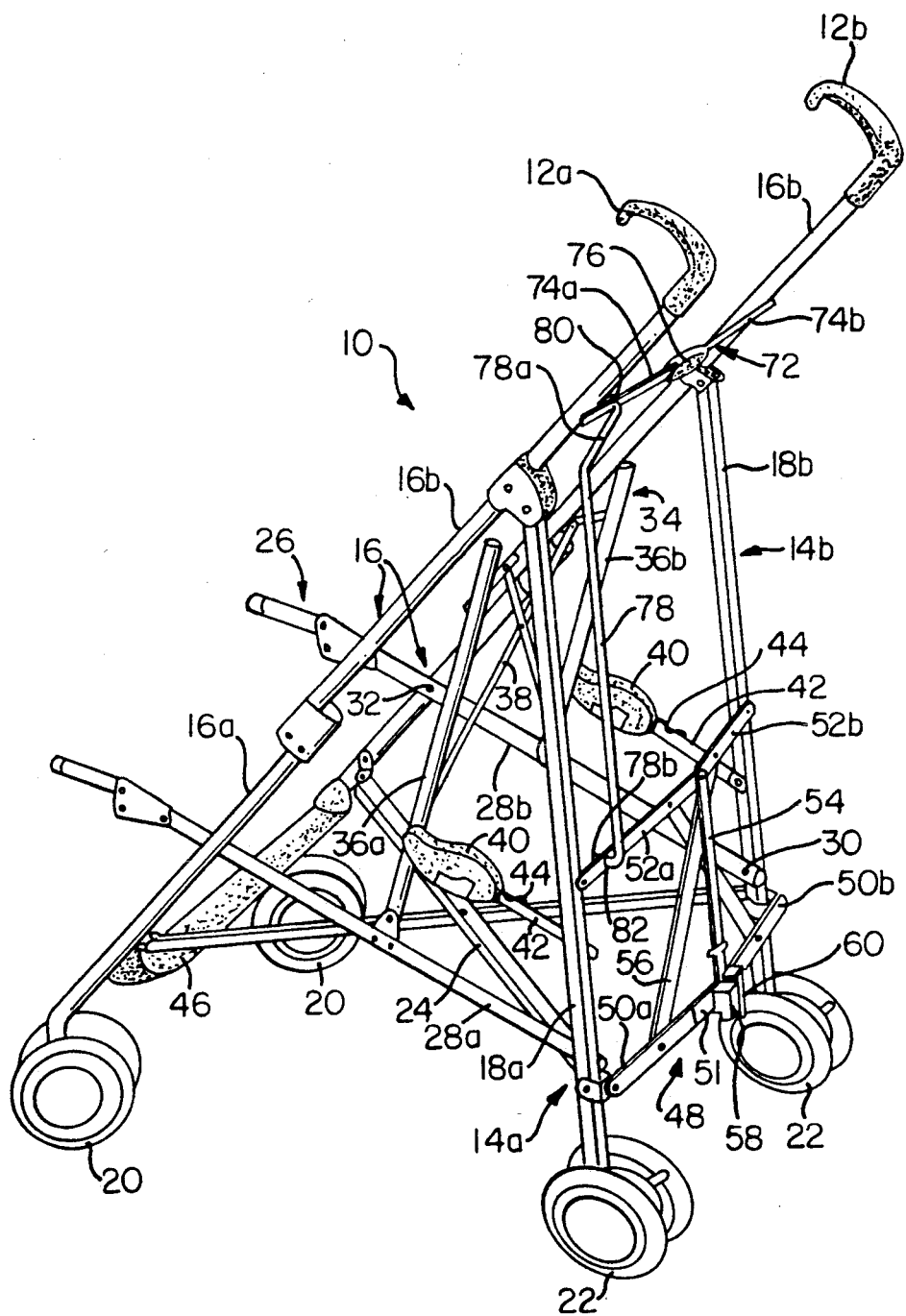
FIG. 1 is a perspective view of the frame of an umbrella stroller according to the present invention, in its fully opened configuration.

Referring to the drawings in detail, the present invention is directed to an umbrella stroller 10. This type of stroller derives its name from the hook shaped handles 12a and 12b that resemble umbrella handles.

Umbrella stroller 10 includes a pair of spaced apart side frame halves 14a and 14b, each having a main side tube 16 and a rear side tube 18 pivotally connected to main side tube 16 at an intermediate portion thereof. Each main side tube 16 includes a lower tube portion 16a that is pivotally mounted at its upper end to an upper tube portion 16b. Hook shaped handles 12a and 12b are fixed to the upper free ends of upper tube portions 16b, and the upper ends of rear side tubes 18 are pivotally connected to an approximate mid-point of upper tube portions 16b.

The free lower ends of lower tube portions 16a carry the front wheels 20 of stroller 10, while the free lower ends of rear side tubes 18 carry the rear wheels 22 of stroller 10.

A lower scissor frame 24 interconnects the lower ends of lower tube portions 16a of main side tubes 16 and the lower ends of rear side tubes 18, at positions above wheels 20 and 22.

A collapsible fabric support structure 26 is also provided. Specifically, collapsible fabric support structure 26 includes two seat fabric support rods 28a and 28b that are pivotally connected by pivot pins 30 at their rear ends to lower ends of rear side tubes 18, at positions immediately above lower scissor frame 24 in the open configuration of FIG. 1. In addition, each fabric support rod 28a and 28b is pivotally secured, at a position approximately 25% of the length of each fabric support rod 28a and 28b from its forward end, to the respective lower tube portion 16a at a position thereof approximately two-thirds of the distance from the lower end thereof, by pivot pins 32. As a result, fabric support rods 28a and 28b are pivotally connected to the lower ends of rear side tubes 18 and to the respective lower tube portions 16a.

Collapsible fabric support structure 26 further includes a back fabric support structure 34. Specifically, back fabric support structure 34 includes two back support rods 36a and 36b pivotally connected at their lower ends to seat fabric support rods 28a and 28b, substantially at mid-points thereof. In the open configuration of stroller 10, as shown in FIG. 1, back support rods 36a and 36b extend in a substantially upright position. A back scissor frame 38 interconnects back support rods 36a and 36b.

Further, back support structure 34 includes liver-shaped housings 40 pivotally connected at one end thereof to lower portions of back support rods 36a and 36b. A bar 42 is pivotally connected at one end to each rear side tube 18a and 18b, with the opposite end thereof slidably received in a respective liver-shaped housing 40. Each bar 42 is provided with a stop 44 to limit the extent that it can slidably travel with its respective liver-shaped housing 40.

A fabric (not shown) is connected to upper tube portions 16b of main side tubes 16 and also to forward portions of seat fabric support rods 28a and 28b, in the same manner as described and shown in the aforementioned U.S. Pat. No. 4,765,645. Thus, the fabric is stretched to provide a seating area for an infant. Further, a flexible foot strap 46 is stretched between lower tube portions 16a of main side tubes 16.

In addition, a lower articulated safety spreader bar mechanism 48 is connected between the lower ends of rear side tubes 18a and 18b in order to hold side frame halves 14a and 14b apart in the open configuration of stroller 10 shown in FIG. 1. Lower articulated safety spreader bar mechanism 48 includes one pair of lower spreader pivoting bars 50a and 50b, each having one end pivotally connected to a lower portion of a respective rear side tube 18a and 18b. The opposite centrally located ends of pivoting bars 50a and 50b are pivotally connected to each other or adjacent each other to a central channel member 51.

Further, lower articulated safety spreader bar mechanism 48 includes another pair of lower spreader pivoting bars 52a and 52b, each having one end pivotally connected to a mid-portion of a respective rear side tube 18a and 18b. The opposite centrally located ends of pivoting bars 52a and 52b are pivotally connected to each other. Pivoting bars 52a and 52b are positioned above pivoting bars 50a and 50b. A vertically oriented connecting bar 54 is connected between the pivot connection of pivoting bars 50a and 50b and the pivot connection of pivoting bars 52a and 52b. As a result, when pivoting bars 50a and 50b are pivoted with respect to each other, pivoting bars 52a and 52b are also pivoted with respect to each other. Further, a scissor frame 56 is connected between pivoting bars 50a, 50b, 52a and 52b.

In order to lock lower articulated safety spreader bar mechanism 48 so as to maintain stroller 10 in its open configuration of FIG. 1, a rest member 58 having a trapezoidal cross-sectional configuration is fixed to the outside face of central channel member 51, with the lesser parallel face 58a thereof being positioned above the greater parallel face 58b thereof, and with both parallel faces 58a and 58b having a substantially horizontal orientation.

A closure lever 60 is pivotally connected at one end thereof to a lower portion of vertically oriented connecting bar 54. Specifically, closure lever 60 includes a vertically oriented pivoting bar strip 60a having one end pivotally connected to the lower portion of vertically oriented connecting bar 54 by a pivot pin 61 and extending downwardly to lesser parallel face 58a, a horizontally oriented locking bar strip 60b which rests on top of lesser parallel face 58a and which is fixed perpendicularly to the lower end of vertically oriented pivoting bar strip 60a, and a vertically oriented handle bar strip 60c which is connected to the opposite end of horizontally oriented locking bar strip 60b and extends downwardly therefrom past the outer side face of rest member 58. It will be appreciated that when horizontally oriented locking bar strip 60b is positioned on top of lesser parallel face 58a, lower articulated safety spreader bar mechanism 48 is locked so as to maintain stroller 10 in its open configuration of FIG. 1.

In order to prevent accidental pivoting of closure lever 60 about pivot pin 61, the free end of vertically oriented pivoting bar strip 60a is provided with ears 62 which extend to opposite sides of vertically oriented connecting bar 54 when closure lever 60 is in the locking position of FIG. 1. A spring 64 also is wound about pivot pin 61. Spring 64 has one end 64a thereof positioned within a hole 66 in vertically oriented connecting bar 54 at a position immediately above the free end of vertically oriented pivoting bar strip 60a. The opposite end 64b of spring 64 is looped and is connected to a tab 68 at the lower end of vertically oriented pivoting bar strip 60a.

Figure 4:
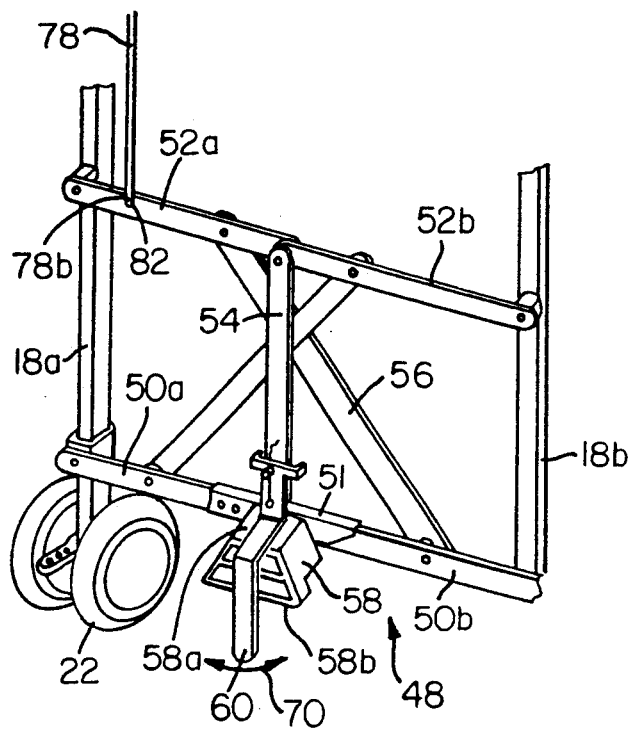
FIG. 4 is a perspective view of the lower articulated safety spreader bar mechanism of the frame of FIG. 1, showing the lower portion of the release bar.
Figure 5:
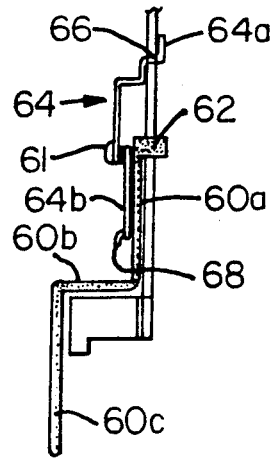
FIG. 5 is a side elevational view of the lower articulated safety spreader bar mechanism of FIG. 4.
Figure 6:
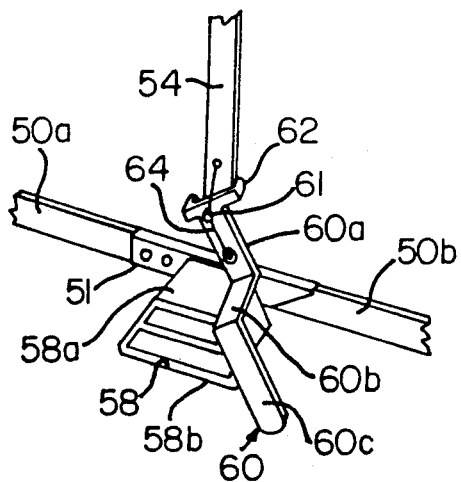
FIG. 6 is a perspective view of the locking mechanism of the lower articulated safety spreader bar mechanism of FIG. 4, in its unlocked position.
Figure 7:
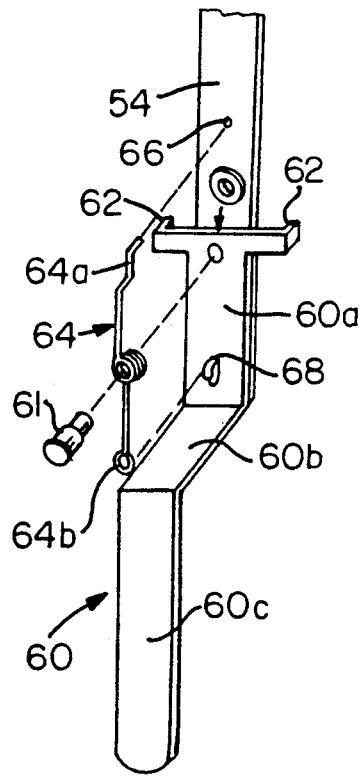
FIG. 7 is a blown apart, perspective view of the locking mechanism of FIG. 6.

Accordingly, to unlock closure lever 60, vertically oriented handle bar strip 60c is grasped and pulled outwardly slightly. Then, vertically oriented handle bar strip 60c is pivoted to one side, as shown by arrow 70 in FIG. 4. Thereafter, the one pair of lower spreader pivoting bars 50a and 50b can be pivoted with respect to each other, and the other pair of lower spreader pivoting bars 52a and 52b can be pivoted with respect to each other, for folding stroller 10.

Figure 2:
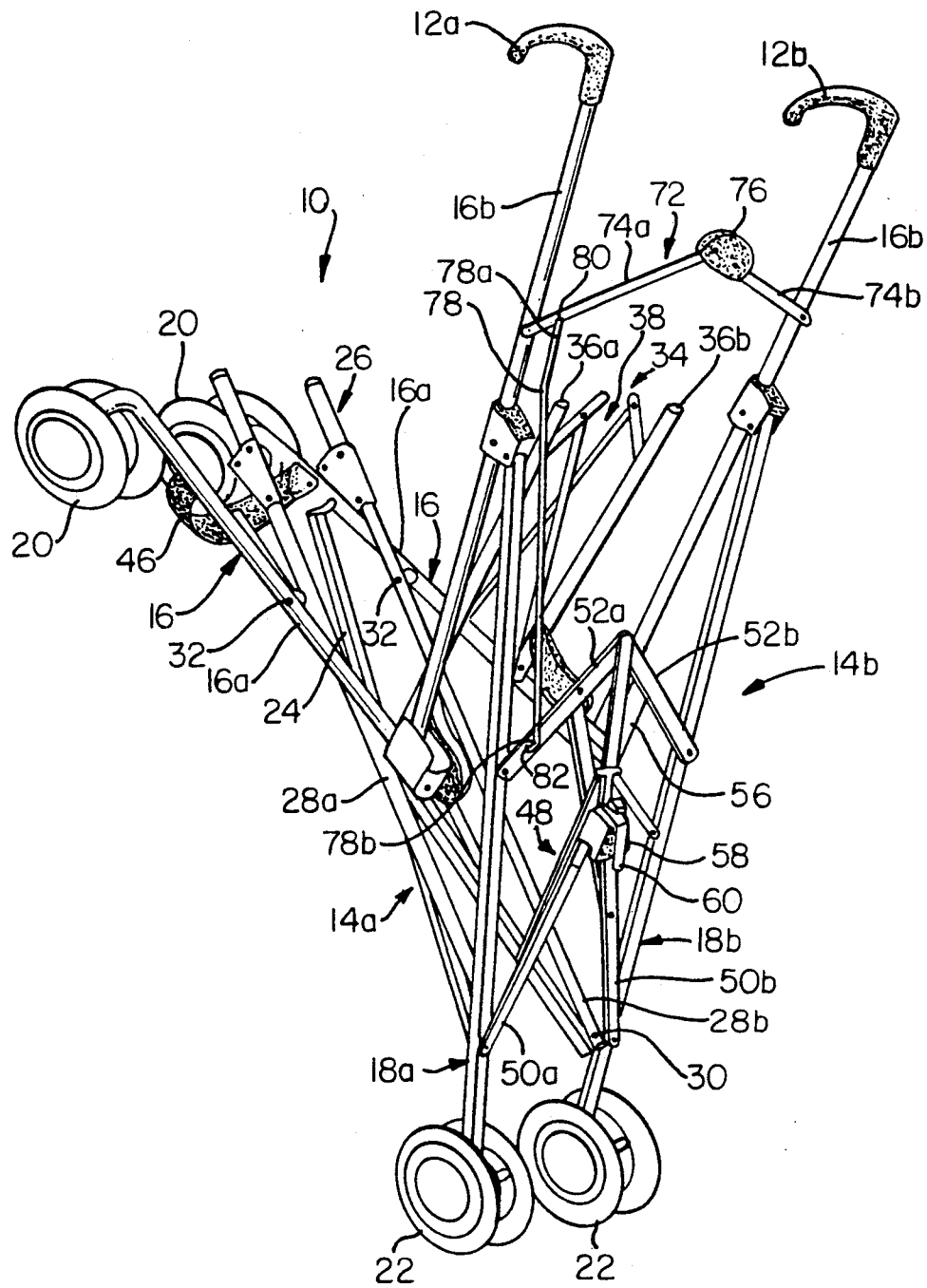
FIG. 2 is a perspective view of the frame of FIG. 1 in its partially closed configuration.
Figure 3:
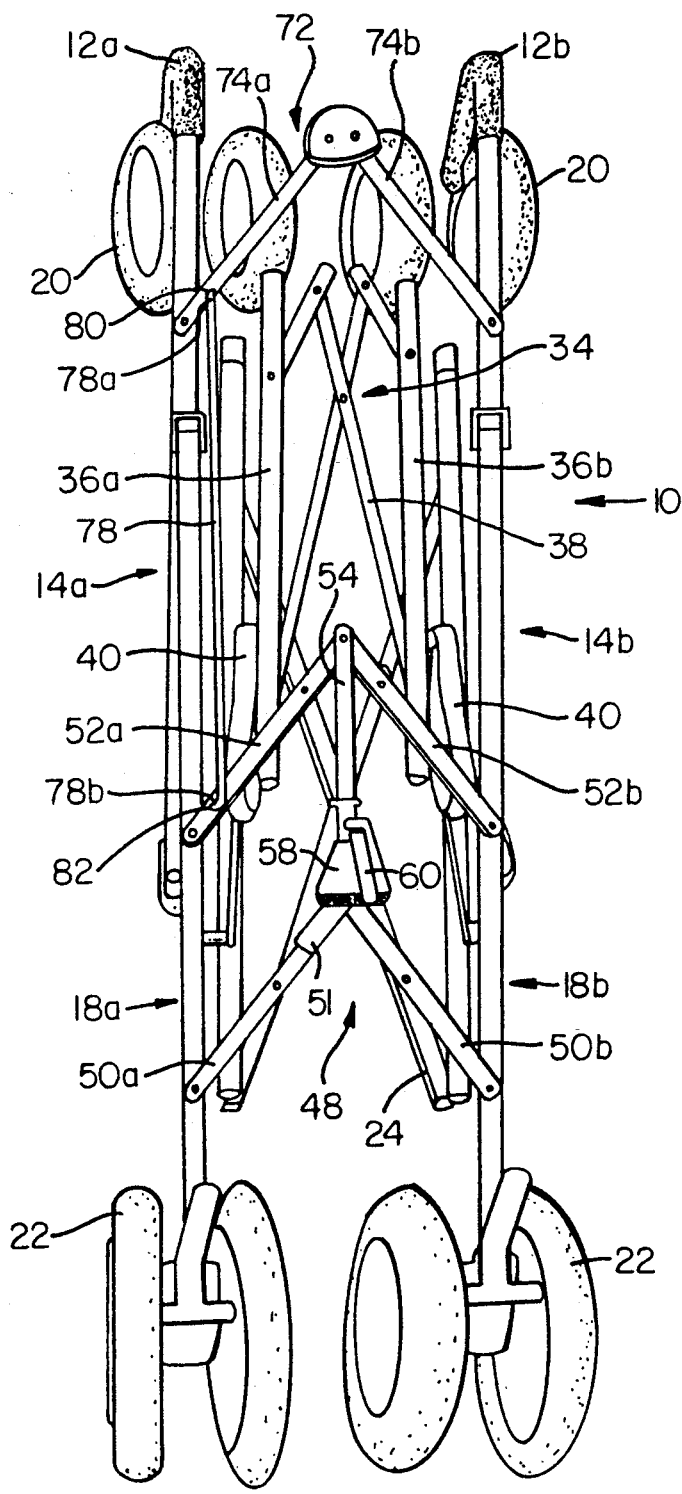
FIG. 3 is a perspective view of the frame of FIG. 1 in its fully closed configuration.

As shown in FIGS. 1–3, stroller 10 further includes an upper articulated safety spreader bar mechanism 72 connected between the upper ends of upper tube portions 16b of main side tubes 16, in order to hold the upper ends of side frame halves 14a and 14b apart in the open configuration of stroller 10 shown in FIG. 1. Upper articulated safety spreader bar mechanism 72 includes a pair of upper spreader pivoting bars 74a and 74b, each having one end pivotally connected to an upper portion of a respective upper tube portion 16a or 16b. The opposite centrally located ends of pivoting bars 74a and 74b are pivotally connected to each other through the intermediary of a channel member 76 which can include a conventional detent mechanism or the like (not shown) for releasably locking spreader pivoting bars 74a and 74b in their locked position of FIG. 1.

However, as discussed above, it has been found that the person closing the umbrella stroller may forget to release the upper articulated safety spreader bar mechanism 72. As a result, when the person attempts to close the stroller, the upper articulated safety spreader bar mechanism 72 will break. As a result, the stroller may not be usable until the upper articulated safety spreader bar mechanism 72 is fixed.

Thus, in accordance with the present invention, a release bar 78 is connected between lower spreader pivoting bar 52a and upper spreader pivoting bar 74a. Specifically, release bar 78 includes a bent upper end 78a that fits within a hole 80 in spreader pivoting bar 74a and a bent lower end 78b that fits within a hole 82 in spreader pivoting bar 52a.

Therefore, when lower articulated safety spreader bar mechanism 48 is unlocked, and the one pair of lower spreader pivoting bars 50a and 50b are pivoted with respect to each other, and the other pair of lower spreader pivoting bars 52a and 52b are pivoted with respect to each other, for folding stroller 10, release bar 78 automatically breaks the lock of channel member 76 and automatically pivots upper spreader pivoting bars 74a and 74b with respect to each other. As a result, accidental breaking of upper articulated safety spreader bar mechanism 72 is prevented, which would otherwise occur if a user attempted to force stroller 10 closed without unlocking spreader pivoting bars 74a and 74b.

As will be appreciated from the above discussion, however, any foldable stroller having side tubes can be used in combination with the present invention.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A stroller comprising:
    a pair of side frames each side frame including a lower portion having a rear supporting leg and an upper portion by which the stroller can be pushed;
    bottom scissor frame means for foldably connecting said side frames together;
    lower articulated safety spreader bar means for releasably locking said lower portion of said side frames in a spaced apart, open configuration, said lower articulated safety spreader bar means being connected to said lower portion of said side frames for pivotal movement in a first direction from a locked position to an unlocked position, and vice versa, said lower articulated safety spreader bar means including a pair of lower pivoting spreader bars, each pivotally connected at one end to a respective said side frame and to a central position at opposite ends thereof, and lower releasable locking means for releasably locking said pair of lower pivoting spreader bars in a locked position in which said lower portions of said side frames are maintained in said spaced apart, open configuration;
    upper articulated safety spreader bar means for releasably locking said upper portion of said side frames in a spaced apart, open configuration, said upper articulated safety spreader bar means being connected to said upper portion of said side frames for pivotal movement in said first direction from a locked position to an unlocked position, and vice versa, said upper articulated safety spreader bar means including a pair of upper pivoting spreader bars, each pivotally connected at one end to a respective said side frame and to a central position at opposite ends thereof, and upper releasable locking means for releasably locking said pair of upper pivoting spreader bars in a locked position in which said upper portions of said side frames are maintained in said spaced apart, open configuration; and
    release bar means connected between one of the upper and one of lower pivoting spreader bars of the upper and lower articulated safety spreader bar means adjacent at least one side frame for automatically moving said upper articulated safety spreader bar means from the locked position to the unlocked position thereof when said lower articulated safety spreader bar means is moved from the locked position to the unlocked position thereof.

2. A stroller according to claim 1, wherein said lower releasable locking means includes a second pair of lower pivoting spreader bars, each pivotally connected at one end to a respective said side frame at a position below the first-mentioned lower pivoting spreader bars and to a central position at opposite ends thereof, a connecting bar which connects together said first-mentioned and second pair of lower pivoting spreader bars, and said lower releasable locking means includes a manually releasable locking assembly which releasably locks said second pair of lower pivoting spreader bars in a locked position such that locking of said second pair of lower pivoting spreader bars results in locking of said first-mentioned pair of lower pivoting spreader bars.

3. A stroller according to claim 2, wherein said lower releasable locking means includes spring biased lever means pivotally mounted at the respective central position of said second pair of lower pivoting spreader bars for releasably locking said second pair of lower pivoting spreader bars in said locked position thereat.

* * * * *